US012747077B2

(12) United States Patent
Arcediano et al.

(10) Patent No.: US 12,747,077 B2
(45) Date of Patent: Sep. 29, 2026

(54) PRINTED OR COATED STRUCTURES FOR DIRECT FOOD CONTACT APPLICATIONS

(71) Applicant: Sun Chemical Corporation, Parsippany, NJ (US)

(72) Inventors: Sandra Arcediano, Gallarta (ES); Jose Ramon Maeso, Gallarta (ES); Setareh Shirazi, Gallarta (ES); Hulya Denktas, Izmir (TR); Halide Sesli, Izmir (TR); Michael Simoni, Newhey (GB)

(73) Assignee: Sun Chemical Corporation, Parsippany, NJ (US)

( * ) Notice: Subject to any disclaimer, the term of this patent is extended or adjusted under 35 U.S.C. 154(b) by 61 days.

(21) Appl. No.: 18/693,893

(22) PCT Filed: Oct. 20, 2022

(86) PCT No.: PCT/ES2022/070670

§ 371 (c)(1),
(2) Date: Mar. 20, 2024

(87) PCT Pub. No.: WO2023/067226

PCT Pub. Date: Apr. 27, 2023

(65) Prior Publication Data

US 2024/0262589 A1 Aug. 8, 2024

Related U.S. Application Data

(60) Provisional application No. 63/270,637, filed on Oct. 22, 2021.

(51) Int. Cl.
*B05D 1/00* (2006.01)
*B65D 65/42* (2006.01)
(Continued)

(52) U.S. Cl.
CPC .............. *B65D 65/42* (2013.01); *C08J 7/042* (2013.01); *C09D 11/08* (2013.01); *C09D 11/102* (2013.01);
(Continued)

(58) Field of Classification Search
CPC ....... B65D 65/42; C08J 7/042; C08J 2367/02; C08J 2401/18; C09D 11/08; C09D 11/102
See application file for complete search history.

(56) References Cited

U.S. PATENT DOCUMENTS

| | | | | |
|---|---|---|---|---|
| 9,346,969 | B2 | 5/2016 | Epple et al. | |
| 2015/0101506 | A1 | 4/2015 | Epple | |
| 2017/0247570 | A1 * | 8/2017 | Pirrung ................ | C09D 183/10 |

FOREIGN PATENT DOCUMENTS

| | | | |
|---|---|---|---|
| EP | 0811508 | | 12/1997 |
| WO | 2011/025858 | A1 | 3/2011 |

(Continued)

OTHER PUBLICATIONS

International Search Report issued in International Application No. PCT/ES2022/070670, mailed Feb. 23, 2023.

(Continued)

*Primary Examiner* — Hai Y Zhang
(74) *Attorney, Agent, or Firm* — Marian E. Fundytus; Amster Rothstein & Ebenstein LLP

(57) ABSTRACT

A method of producing a printed structure comprising the steps of:
(i) providing a substrate;
(ii) subsequently printing one or more coating layers of direct food contact (DFC)-compliant overprint varnish (OPV) onto a first side of the substrate, wherein the DFC-compliant OPV comprises no more than 2.0% by weight of any colorants relative to the weight of the OPV.

17 Claims, 2 Drawing Sheets

(51) Int. Cl.
*C08J 7/04* (2020.01)
*C09D 11/08* (2006.01)
*C09D 11/102* (2014.01)

(52) U.S. Cl.
CPC ........ *C08J 2367/02* (2013.01); *C08J 2401/18* (2013.01); *C08J 2429/14* (2013.01); *C08J 2475/04* (2013.01)

(56) References Cited

FOREIGN PATENT DOCUMENTS

| | | | | |
|---|---|---|---|---|
| WO | WO-2021007422 A1 * | 1/2021 | ............. | D21H 19/60 |
| WO | 2022/064090 A2 | 3/2022 | | |

OTHER PUBLICATIONS

Written Opinion of the International Searching Authority issued in International Application No. PCT/ES2022/070670, mailed Feb. 23, 2023.

International Preliminary Report on Patentability (Chapter II of the Patent Cooperation Treaty) issued in International Application No. PCT/ES2022/070670, mailed Nov. 27, 2023.

Outcome of the public consultation on the draft guidance on the use of the Threshold of Toxicological Concern approach in food safety assessment. Approved: May 17, 2019, doi:10.2903/sp.efsa.2019.EN-1661.

Guidance on the use of the Threshold of Toxicological Concern approach in food safety assessment, Adopted: Apr. 24, 2019, doi: 10.2903/j.efsa.2019.5708.

Priority topics for the development of risk assessment guidance by EFSA's Scientific Committee in 2016-2018, Adopted: May 19, 2016, doi: 10.2903/j.efsa.2016.4502.

Review of the Threshold of Toxicological Concern (TTC) approach and development of new TTC decision tree. Published: Mar. 10, 2016.

International Preliminary Report on Patentability (Chapter II of the Patent Cooperation 27, 2023. Treaty) issued in International Application No. PCT/ES2022/070670, mailed Nov. 27, 2003.

Scientific Opinion on Exploring options for providing advice about possible human health risks based on the concept of Threshold of Toxicological Concern (TTC). EFSA Journal 2012;10(7):2750.

EuPIA Guidance for Risk Assessment of Non-Intentionally Added Substances (NIAS) and Non-Evaluated or Non-Listed Substances (NLS) in printing inks for food contact materials (May 2021).

Good Manufacturing Practice (GMP) Printing Inks for Food Contact Materials (4th Edition; Mar. 2016; published by European Printing Ink Association.

* cited by examiner

PRINTED OR COATED STRUCTURES FOR DIRECT FOOD CONTACT APPLICATIONS

CROSS REFERENCE TO RELATED APPLICATIONS

The present application is a § 371 National Phase application based on PCT/ES2022/070670 filed Oct. 20, 2022, which claims the benefit of U.S. Provisional Application No. 63/270,637, filed Oct. 22, 2021 the subject matter of each of which is incorporated by reference in their entirety.

The present invention relates to printed or coated structures suitable for direct food contact (DFC) applications in which the printed or coated structure comprises (DFC)-compliant inks and coatings (e.g. overprint varnishes (OPVs)). Advantageously, the printed or coated structures according to the present invention are more easily recycled than printed or coated structures currently used in food packaging, which typically include a siliconated paper.

Direct food contact (DFC) inks and coatings (including OPVs) are intended to be in direct physical contact with food, for instance in food packaging. Thus, DFC inks and coatings may be used on the inside of food packaging. For DFC applications, the diffusion path between ink or coating and food is short, and so DFC inks or coatings have a greater potential for migration into the food compared to non-direct food contact (non-DFC) inks, which are used on the non-food contact surfaces of food packaging or other articles. The term "non-direct food contact" is also referred to as "indirect food contact" and describes a material (such as an ink or coating) which has a functional barrier layer between it and the food substance, wherein there is potential for the material to come into contact with the food substance. An example of an indirect food contact ink is an ink applied to the outside of food packaging or to an intermediate layer of food packaging. Although there is a potential for migration from non-DFC inks, it is lower than the risk with DFC inks and coatings.

DFC inks and coatings are advantageous in food packaging applications as they reduce the number of layers required in the packaging, thereby increasing sustainability and recyclability. For example, additional laminate layers between the food and ink are not required since the ink or coating can be in direct contact with the food. DFC inks and coatings may also be printed directly onto the food product, which means less packaging is required overall.

One of the difficulties with formulating ink and coating compositions suitable for direct food contact is that the national or regional regulatory frameworks which regulate food contact materials have relatively short lists of allowed and forbidden substances which are suitable for use as food contact inks and coatings. Accordingly, the food packager has a relatively small number of materials from which to choose, and therefore has limited options for the design of images and information to be displayed on the surfaces of food packaging, particularly those surfaces which are in direct contact with the food.

EP 0,811,508, WO 2021/007422 and U.S. Pat. No. 9,346,969 describe an ink or varnish that is suitable for use in food packaging applications. None of these documents disclose a printed structure in which any and all inks and coatings used on the surface of the structure that is intended to be in direct food contact are exclusively direct food contact (DFC)-compliant inks and coatings. In addition, none of these documents address the problem of improving recyclability of food packaging.

Printed applications have long been used for food and pharma packaging. The present invention relates to printed structures that are comprised of overprint lacquers (also known as overprint varnishes or OPV's), and optionally also inks and/or further coatings, that are suitable for direct food contact (DFC) applications. As will be understood in the art, an OPV is a coating. The OPV's used in the printed structures of the present invention are based wholly on materials that are determined to be safe for DFC applications. Thus, the OPVs used in the printed structures of the present invention are defined as being DFC-compliant, which means that they comprise exclusively of materials determined as being safe for direct food contact. In addition, the OPVs used in the printed structures of the present invention advantageously have the property that when printed directly onto the substrate or over the top of one or more layers of DFC-compliant inks, the OPV's readily release from the substance that they are in contact with (e.g. chewing gum or other edible product). This prevents undesirable sticking of the substance (e.g., chewing gum) to the OPV. The process for determining that the materials of the OPV are safe for DFC applications is described below.

The DFC-compliant OPV is designed to replace siliconated paper, which is the current state of the art e.g., in food packaging. The main disadvantage of siliconated paper is that it is a contaminant in the recycling process and thus creates waste that finds its way into traditional waste streams (e.g. landfills). The OPV's used in the current invention are formulated to be more easily recycled while being DFC-compliant and providing the required performance properties of traditional siliconated paper. Additionally, the supply and quality of siliconated paper is known to be unpredictable and unreliable. Replacing the siliconated paper with an OPV provides a solution for these ongoing issues. And lastly, the use of siliconated paper in packaging constructs requires special handling and machinery that could be eliminated by using the OPV's of the current invention.

SUMMARY OF INVENTION

The present invention provides:

[1] A method of producing a printed structure comprising the steps of:
- (i) providing a substrate;
- (ii) subsequently printing one or more coating layers of direct food contact (DFC)-compliant overprint varnish (OPV) onto a first side of the substrate, wherein the DFC-compliant OPV comprises no more than 2.0% by weight of any colorants relative to the weight of the OPV.

[2] The method of [1] wherein said OPV is printed directly onto the substrate.

[3] The method of [1] comprising the steps of:
- (i) providing a substrate;
- (ii) printing one or more layers of DFC-compliant ink onto a first side of the substrate;
- (iii) subsequently printing one or more coating layers of DFC-compliant OPV over the top of said one or more DFC-compliant ink layers, wherein the DFC-compliant OPV comprises no more than 2.0% by weight of any colorants relative to the weight of the OPV.

[4] A method according to any of [1] to [3] wherein said first side of the substrate in the final printed structure is comprised exclusively of DFC-compliant coatings and, where present, DFC-compliant inks.

[5] The method of any of [1], [3] or [4] comprising the steps of:
(i) providing a substrate;
(ii) printing one or more layers of DFC-compliant ink onto a first side of the substrate;
(iii) printing one or more layers of an ink onto a second side of the substrate;
(iv) subsequently printing one or more coating layers of DFC-compliant OPV over the top of said one or more DFC-compliant ink layers on said first side of the substrate, and preferably not printing an OPV over the top of said one or more layers of ink on said second side of the substrate.

[6] The method of [5] wherein said printed structure is suitable for use as food packaging and said first side of the substrate faces towards the interior of the packaging and said second side of the substrate is an exterior-facing side of the packaging.

[7] The method of any of [1] to [6] wherein the substrate is a single layer substrate.

[8] The method of any of [1] to [7] wherein the substrate is a monomaterial.

[9] The method of any of [1] to [8] wherein the OPV comprises no more than 1.5% by weight of any colourants, preferably no more than 1.0% by weight, relative to the weight of the OPV.

[10] The method of any of [1] to [9] wherein the OPV does not comprise any colorant.

[11] The method of any of [1] to [10] wherein the OPV comprises a silicone release agent.

[12] The method of [11] wherein the silicone release agent is present in the printed structure in an amount of 1.0 to 47.0%, preferably 2.0 to 40.0%, more preferably 3.0 to 35.0% by dry weight of the OPV layer.

[13] The method of [11] or [12] wherein the silicone release agent is an acyclic polydimethylsiloxane (PDMS), preferably a linear acyclic PDMS.

[14] The method of any of [11] to [13] wherein the silicone release agent has a molecular weight of greater than 5000 Daltons, preferably greater than 6800 Daltons.

[15] The method of any of [1] to [14], wherein the printed structure exhibits a kinetic CoF of 0.10-0.23, preferably 0.14-0.18.

[16] The method of any of [1] to [15], wherein the printed structure exhibits a static CoF of 0.12-0.16, preferably 0.16-0.22.

[17] The method of any of [1] to [16], wherein the printed structure exhibits a Lloyd release value of 0-2.0; preferably 0-1.5.

[18] The method of any of [1] to [17], wherein the printed structure exhibits visual release properties.

[19] The method of any of [1] to [18], wherein the printed structure exhibits heat seal resistance.

[20] The method of any of [1] to [19], wherein the migration limits for all printed materials used to make the printed structure are below the threshold for a human of 60 kg in accordance with the EU Cube Model.

[21] The method of any of [1] to [20], wherein the substrate is selected from the group consisting of PE, PP, PET, OPP, aluminum foil and combinations thereof.

[22] The method of any of [1] to [21], wherein the substrate is a twistable polyester film, preferably a twistable polyethylene terephthalate (PET) film.

[23] The method according to any of [1] to [22], wherein said printed structure is comprised exclusively of DFC-compliant coatings and, where present, DFC-compliant inks.

[24] A printed structure produced by any one or more of the methods of any of [1] to [23].

[25] The printed structure of [24], being a DFC-compliant food packaging structure.

[26] The printed structure of [25], wherein the structure is a chewing gum packaging structure.

[27] A printed structure for direct food contact comprising:
(i) a substrate; and
(ii) one or more OPV layers on a first surface of the substrate, wherein the OPV consists of materials that are safe for direct food contact.

[28] The printed structure of any of [24] to [27] that does not comprise siliconated paper.

DETAILED DESCRIPTION OF THE INVENTION

A typical printed structure has the following layer structure: first ink layer on the underside (i.e., exterior facing) of the substrate, substrate, second ink layer on the top side (i.e., the interior facing) of the substrate, and siliconated paper, in that order. The printed structure of the present invention preferably has the following layer structure: first ink layer on the underside (i.e., exterior facing) of the substrate, substrate, second ink layer on the top side (i.e., the interior facing) of the substrate, and OPV, in that order. In the present invention, all of the inks and OPVs on the interior facing side of the printed substrate (i.e., the side of the structure that is intended to be in direct food contact) are DFC-compliant. Hence, in the printed structure of the present invention, a DFC-compliant OPV replaces siliconated paper.

Figure 1A:
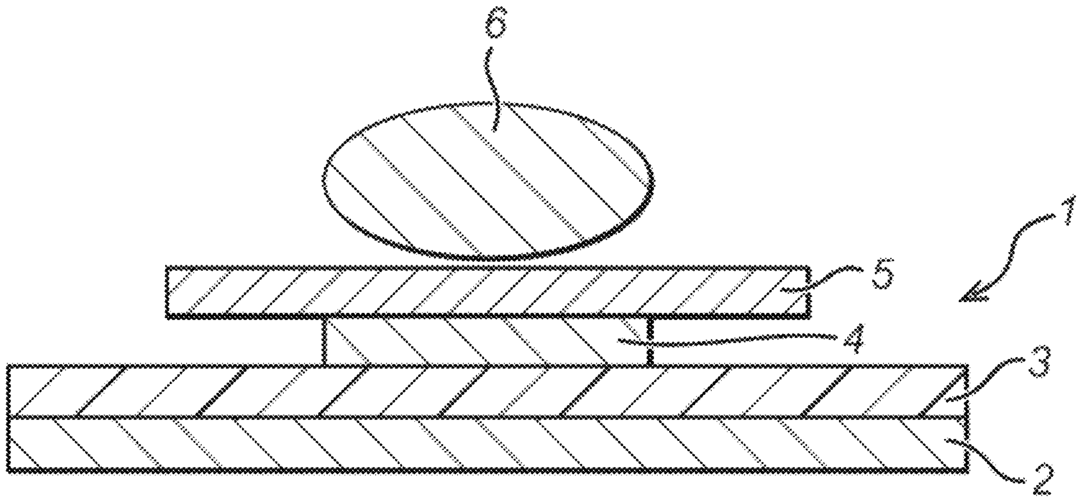
FIG. 1A illustrates a typical printed structure known in the art and FIG. 1B illustrates a preferred printed structure according to the invention.

A typical printed structure is shown in FIG. 1A. In particular, in FIG. 1A, a first layer of ink or coating (2) is printed onto the $2^{nd}$ surface (underside) of a substrate (3), in this case Twist PET; next, one or more layers of ink or coating (4) are optionally printed onto the $1^{st}$ surface (top side) of the substrate; next, a siliconated paper (5) is applied over the top to create a finished packaging structure (1); and lastly, a product (6) (in the present example the product is sugar-free chewing gum) is placed into the packaging structure on top of the siliconated paper. As will be understood by the skilled person, wax paper or other materials have been used as a substitute for the siliconated paper.

Figure 1B:
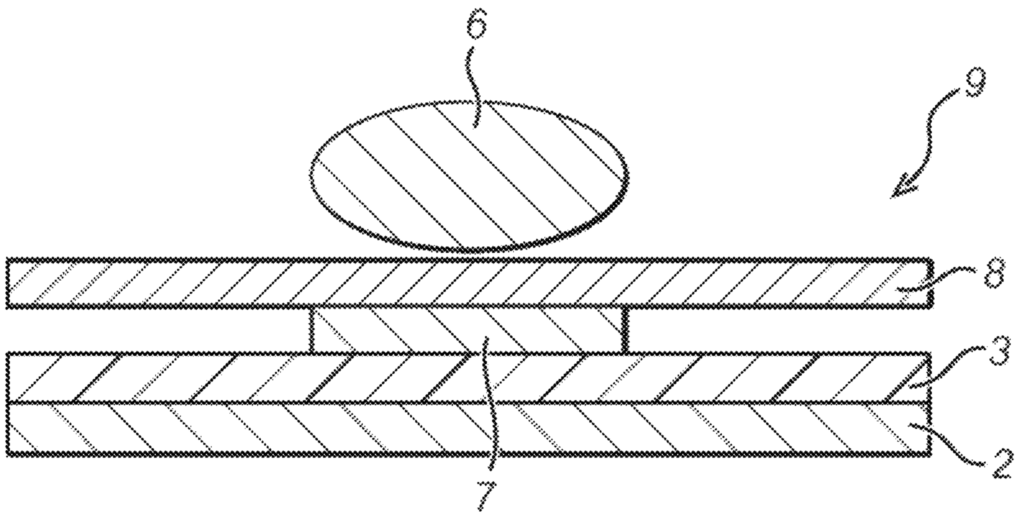

A printed structure (9) according to the invention is shown in FIG. 1B. In FIG. 1B, the same layers are present as FIG. 1A, with two exceptions: (i) a DFC-compliant ink (7) is used on the $1^{st}$ surface of the substrate in FIG. 1B; and (ii) the DFC-compliant OPV (8) of the present invention is printed as a replacement for the siliconated paper in FIG. 1B.

The OPV used in the present invention exhibits good release properties from the packaged (food) product. This is advantageous as it typically would be undesirable to have a packaging structure that sticks to the product that is contained in the package. This advantageous characteristic is shown in the examples section below.

Preferably, the substrate of the printed structure according to the invention is a monolayer (i.e. the substrate has a single layer). Preferably, a monolayer substrate is a monomaterial, in the sense that the substrate consists essentially of a single polymeric material. In this context, the term "consisting essentially of" means that the substrate is composed of at least 95%, preferably at least 98% and typically at least 99% of a single polymeric material, by weight of the total substrate, and optionally further comprises minor amounts of additives and/or impurities (such as the additives conventionally added to polymeric materials suitable for packaging materials and/or the impurities conventionally presented in polymeric materials suitable for packaging materials). The advantages of such a substrate include lightweighting in addition to recyclability. Lightweighting is a process by which existing packaging is adjusted and redesigned to reduce the overall weight of the item. Lightweighting is a sustainable practice that helps reduce a company's carbon footprint while improving manufacturing processes.

Printed chewing gum packages are used throughout the present application to exemplify the invention, but it will be readily understood that the present invention is not limited to printed chewing gum packages and can be used for packaging structures for virtually any product, especially food products requiring DFC safety protocols. Although the printed structure according to the present invention is preferably for use in food packaging it may be used for non-food items as well.

As demonstrated in FIG. 1B, the OPV of the present invention is preferably printed over the top of DFC-compliant ink(s). However, alternatively, the OPV may also be printed directly onto the substrate, without first applying one or more printing inks.

There is no particular limit to the substrate that is used to provide the printed or coated structures of the present application. The substrate is preferably a polymeric substrate. Examples of typical substrates include but are not limited to Twist PET (polyethylene terephthalate), PET, coated PET, metallized PET, aluminum, PVC (polyvinyl chloride), OPP (orientated polypropylene), PP (polypropylene), PE (polyethylene), OPA (orientated polyamide), paper, metalized versions of these substrates, etc. One substrate of particularly utility in the present invention is "Twist PET"—a twistable polyester (polyethylene terephthalate) film that imparts improved twistability for use in twist packaging applications (e.g. various food and candy wrappers, chewing gum wrappers, etc.). A twistable polyester film typically has an elongation to break (ETB) in the machine direction smaller than the elongation to break in the transverse direction, wherein the difference in elongation between both directions is up to 10-30%. Elongation to break is preferably measured according to test method ASTM D882 (for instance using an Instron model 3111 on samples of size 10 mm×100 mm at a controlled temperature (23° C.) and relative humidity (50%), and a crosshead speed of 25 mm/min and a strain rate of 50%). As will be understood by the person skilled in the art, the "machine" and "transverse" directions of the film refer to the planar orthogonal dimensions of the film which correspond to the manufacturing direction of the film line (the machine direction corresponding to the longest dimension of the film).

An object of the present invention is to provide printed structures with OPV's based on materials that are suitable for direct food contact and exhibit other desirable properties, such as good adhesion to the substrate and good physical resistance properties. A particular object of the present invention is to provide printed structures with OPV's exclusively based on materials that are suitable for direct food contact and exhibit other desirable properties, such as good adhesion to the substrate and good physical resistance properties. Unless stated otherwise, an OPV (or an ink) is exclusively based on (i.e. comprised exclusively of) materials that are suitable for direct food contact when all of the materials identified in said OPV (or ink) have been determined to be safe for DFC. Unless stated otherwise, the term "consists of" is used herein in relation to OPVs (or inks) to refer to those OPVs (or inks) that are comprised exclusively of materials that are suitable for direct food contact.

In the present invention, the inventors used their knowledge of chemistry along with their analytical capability and regulatory risk assessment skills to find materials that can be used in DFC OPVs which do not contain substances that will migrate into food at levels which could endanger human health or become unintentional food additives at levels which could endanger human health.

A general process for identifying materials suitable for use in DFC-compliant OPVs that can be used to provide printed structures for DFC applications is described below. As will be understood, this process can also be used for identifying materials suitable for use in DFC-compliant inks that can optionally also be used to provide printed structures for DFC applications. A process for identifying materials which are safe for direct food contact (i.e., DFC-compliant) is described in WO2022/064090.

1. Initially, the inventors selected raw materials (resins, solvents, additives, etc.) which are food safe and/or have low migration levels. Once the raw materials are selected, they are combined to formulate an OPV composition.
2. The raw materials were then subject to an extraction test in order to identify all of the substances in said materials. A suitable extraction test is described below. As will be understood in the art, extraction testing can be performed by any suitable analytical technique such as gas chromatography—mass spectrometry (GC-MS).
3. The inventors used the information that they had about the known impurities within the materials from step 1 along with the analytical data from the extraction testing (step 2) to establish what substances in the OPV's could have some regulatory concern. The inventors then performed a substance risk assessment of the substances considered to have regulatory concern (i.e. known impurities and those substances found from the analytical testing). To perform the substance risk assessment, the inventors first established a Safe Migration Limit (SML) for each of these substances. Some of the substances have published Safe (or Specific) Migration Limits, but many of these substances do not have published migration limits as Non-Intentionally Added Substances (NIASs) are out of scope of many of the specific regulations. However, it is still possible to use a risk assessment-based methodology, considering the toxicology of the substance and an appropriate exposure model to create a self-derived migration limit. The self-derived migration limits (or levels) may be derived from a hazard assessment following the process set out in the EuPIA (European Printing Ink Trade Association) document: EuPIA Guidance for Risk Assessment of Non-Intentionally Added Substances (NIAS) and Non-Evaluated or Non- Listed Substances (NLS) in printing inks for food contact materials. This document follows EFSA (European Food Safety Authority) methodology. In the present invention, the self-derived specific migration limits are derived on the basis of the standard EU Cube exposure model. The specific migration limits (including the self-derived specific migration limits) are compared with the worst-case calculations. The worst-case calculation is based on 100% migration from the dried film to the food and is based on the standard EU Cube exposure model, which is described below.

4. Migration testing is then conducted, which suitably involves printing the OPV composition (e.g. from step (1)) onto a substrate (e.g. an aluminium foil; for instance at a coat weight of 2.0 $g/m^2$) and empirically determining by chemical analysis the migration level of each of the identified substances. Suitable migration tests are described below.

Using this methodology, the inventors were able to advantageously show that the materials used in the OPVs (and inks where used) do not contain substances that will migrate into food at levels which could endanger human health, with a significant margin for safety. Thus, the inventors are able to prepare a printed structure comprising DFC-compliant inks and coatings.

Examples of the types of materials that would be typically used in the overprint OPV's to provide the printed structures of the present invention include but are not limited to those described below.

Colorants/Pigments: OPV's are typically free of colorants, but occasionally small amounts of colorants (no more than 2.0% by weight, preferably no more than 1.5% by weight, more preferably no more than 1.0% by weight) can be added to provide a tinted OPV, if desired. If used, these colorants need to be approved for DFC applications. Examples of DFC colorants with good color gamut are exemplified in WO2022/064090. Preferably, the OPVs used in the present invention do not contain any colorants.

The coatings of the present invention may include one or more of the following resins: nitrocellulose, polyurethane urea, vinyl, polyurethane, polyester, polyisocyanate, PVDC (polyvinylidene chloride), cellulosic resins (e.g., cellulose acetate butyrate (CAB) or cellulose acetate propionate (CAP)), acrylic, ketonic resins, or maleic resins. The resins are food safe and/or have low migration levels and are therefore suitable for use in direct food contact inks.

Preferably, the coatings of the present invention include a nitrocellulose resin together with one or more additional resins such as a polyurethane urea, polyvinyl butyral (PVB), CAB or blend thereof. Preferably, the coatings of the present invention include ≥5% by weight of nitrocellulose resin, preferably ≥7% by weight.

Many different solvents can be used in the OPV's of the invention, such as esters (ethyl acetate and propyl acetate), ketones (methyl ethyl ketone and acetone), alcohol (ethanol, n-propanol and isopropanol), glycol (ethoxy propanol and methoxy propanol), and water.

The OPVs of the present invention advantageously comprise a release agent. Any release agent may be used provided that the release agent has the requisite migration resistance and release properties. Preferably, the release agent is a silicone. Advantageously, coatings comprising silicone provide the printed structure with anti-slip properties and therefore improve the release of a packaged item (e.g., a chewing gum) from the printed structure. Consequently, the printed substrate does not require any siliconated paper when used in food packaging making the printed structure according to the invention easier to recycle and lightweight. Lightweighting (i.e., the process by which existing packaging is adjusted and redesigned to reduce the overall weight of the item) is a sustainable practice that helps reduce a company's carbon footprint while improving manufacturing processes.

Preferably, the silicone release agent is present in the OPV coating composition in an amount of no more than 7.0% by weight, more preferably no more than 6.0% by weight, relative to the weight of the OPV coating composition. Preferably, the silicone release agent is present in the OPV coating composition in an amount of 0.5-7.0% by weight, more preferably 1.0-6.0% by weight, relative to the weight of the OPV coating composition. Preferably, the silicone release agent is present in the printed structure in an amount of 1.0 to 47.0%, preferably 2.0 to 40.0%, more preferably 3.0 to 35.0% by dry weight of the OPV layer.

Where used, the silicone release agent is safe for direct food contact.

Preferably, the silicone release agent is an acyclic polydimethylsiloxane (PDMS), preferably a linear acyclic PDMS.

Where the silicone release agent is an acyclic PDMS (particularly an acyclic linear PDMS) it preferably contains less than 10 ppb of cyclic polysiloxane impurities such as decamethylcyclopentasiloxane or dodecamethylcyclohexasiloxane, more preferably it is free from (i.e., contains no detectable levels of) impurities such as decamethylcyclopentasiloxane or dodecamethylcyclohexasiloxane.

Preferably the silicone release agent has a molecular weight of greater than 5000 Daltons, preferably greater than 6800 Daltons, particularly wherein the silicone release agent is an acyclic or linear acyclic PDMS. Preferably, the silicone release agent has a molecular weight of 5000 to 30000 Daltons, preferably 6800 to 30000 Daltons, particularly wherein the silicone release agent is an acyclic or linear acyclic PDMS.

Where the silicone release agent is a linear acyclic PDMS having a molecular weight of greater than 6800 Daltons, it preferably contains less than 10 ppb of cyclic polysiloxane impurities such as decamethylcyclopentasiloxane or dodecamethylcyclohexasiloxane, more preferably it is free from (i.e., contains no detectable levels of) impurities such as decamethylcyclopentasiloxane or dodecamethylcyclohexasiloxane.

The OPV composition may include waxes such as but not limited to amide wax, erucamide wax, polypropylene wax, paraffin wax, polyethylene wax, teflon, carnauba wax and the like. The wax may be a combination of said waxes.

As with most ink and coating compositions, additives may be incorporated to enhance various properties. A partial list of such additives includes but is not limited to adhesion promoters, light stabilizers, flow promoters, defoamers, antioxidants, stabilizers, surfactants, dispersants, plasticizers (monomeric such as acetyl tributyl citrate (ATBC) and dibutyl sebacate (DBS) or polymeric such as polyvinyl butyral (PVB)), rheological additives etc.

Preferably, the OPV coating compositions used to make the printed structures of the present invention have a total solids content of 5 to 40% by weight, preferably 10 to 35% by weight, more preferably 15 to 30% by weight.

Preferably, the printed structure according to the invention exhibits a Lloyd release value of 0-2.0; preferably 0-1.5; more preferably 0-1.20; even more preferably 0-0.7; or even more preferably still 0-0.5 N/25 mm.

The present invention is drawn to a printed structure for DFC applications, and as such, all of the printed inks and coatings are DFC-compliant. In the present application, the DFC-compliant inks are those disclosed in WO2022/064090.

There is no restriction on the type of OPV's that could be formulated according to the present method. OPV's for lithographic, screen, flexo, gravure, inkjet, printing etc. would all be within the scope of the present invention.

Molecular weight—"molecular weight" or "average molecular weight" is a reference to the number average molecular weight (Mn). The molecular weight is suitably measured by techniques known in the art such as gel permeation chromatography. Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Δ (5 μm mixed, 300 mm×19 mm, Waters Millipore Corporation, Milford, MA, USA) and THF as mobile phase. The skilled person will appreciate that this definition of molecular weight applies to polymeric materials which typically have a molecular weight distribution.

Unless stated otherwise, the Lloyd release value is suitably measured by cutting a printed substrate into 2.5 cm×12 cm pieces. Adhesive tape is adhered to the lacquered surface of the substrate thus making a laminate. The two layers of the laminate are then separated carefully and fixed to the clamps of the Lloyd Ametek 50N Load cell tensile tester and drawn apart at a speed of 100 mm/minute. Average bond strength values are noted in N/25 mm. Preferably, the Lloyd release value is in the range of 0-2.0 N/25 mm, the closer to 0 being the better.

The invention is further described by the following numbered paragraphs:

1. A method of producing a printed structure comprising:
   providing a substrate;
   printing one or more layers of DFC-grade ink on one or both sides of the substrate; and subsequently printing one or more layers of DFC-grade OPV over the top of the one or more DFC-grade ink layers to provide a final printed structure that is comprised exclusively of DFC-compliant inks and coatings. It will be appreciated that the term "a final printed structure that is comprised exclusively of DFC-compliant coatings" refers to a printed structure which comprises a substrate and further comprises one or more coatings disposed on a first side of said substrate wherein all of said coatings on said first side of said substrate are DFC-compliant and said first side of said substrate is intended to be brought into direct food contact. The final printed structure may include one or more ink or coating layers on a second side of said substrate wherein said second side of said substrate is not intended to be in direct food contact. The one or more ink or coating layers on said second side of said substrate (i.e., the side of said substrate that is not intended to be in direct food contact) may be non-DFC-compliant inks or coatings. Similarly, it will be appreciated that the term "a final printed structure that is comprised exclusively of DFC-compliant inks and coatings" refers to a printed structure which comprises a substrate and further comprises one or more inks and one or more coatings disposed on a first side of said substrate wherein all of said one or more inks and all of said one or more coatings on said first side of said substrate are DFC-compliant and said first side of said substrate is intended to be brought into direct food contact. Preferably, the substrate is also DFC-compliant.
2. The method of paragraph 1, wherein the printed structure exhibits a kinetic CoF of 0.10-0.23, more preferably 0.14-0.18.
3. The method of paragraph 1, wherein the printed structure exhibits a static CoF of 0.12-0.16, more preferably 0.16-0.22.
4. The method of paragraph 1, wherein the printed structure exhibits a release value of 0-2.0; more preferably 0-1.5; more preferably 0-1.20; more preferably 0-0.7; most preferably 0-0.05.
5. The method of paragraph 1, wherein the printed structure exhibits passing visual release properties.
6. The method of any preceding paragraph, wherein the printed structure exhibits passing heat seal resistance properties.
7. The method of any preceding paragraph, wherein the migration limits for all printed materials used to make the printed structure are below the threshold for a human of 60 kg in accordance with the EU Cube Model.
8. The method of any preceding paragraph, wherein the substrate is selected from the group consisting of PE, PP, PET, OPP, aluminum foil and combinations thereof.
9. A printed structure produced by any one or more of the methods of paragraphs 1-8.
10. The printed structure of paragraph 9, being a DFC-compliant food packaging structure.
11. The printed structure of paragraph 10, wherein the structure is a chewing gum packaging structure.

The present invention has been described in detail, including various embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed.

In the examples, the inks are those disclosed in WO2022/064090.

TABLE 1

| Inventive Example OPV's | | | | | | | |
|---|---|---|---|---|---|---|---|
| Example | 1 | 2 | 3 | 4 | 5 | 6 | 7 |
| Nitrocellulose (NC) Varnish | 7.7 | 7.7 | 7.7 | 8.3 | 8.7 | 7.7 | 8.7 |
| PU Resin | 24.3 | 24.3 | 24.3 | 23.3 | 23.3 | 24.3 | 23.3 |
| PVB Resin | 1.8 | 1.8 | 1.8 | 1.8 | 1.8 | 1.8 | 1.8 |
| CAB | 1.6 | 1.6 | 1.6 | 1.6 | 1.6 | 1.6 | 1.6 |

TABLE 1-continued

| Inventive Example OPV's | | | | | | | |
|---|---|---|---|---|---|---|---|
| Solvent | 26.6 | 23.6 | 22.6 | 24 | 22.6 | 21.6 | 21.6 |
| Solvent | 36 | 36 | 36 | 36 | 36 | 36 | 36 |
| Wax | 1 | 1 | 1 | 1 | 1 | 1 | 1 |
| Silicone Slip Agent-1 | 0 | 3 | 4 | 3 | 4 | 5 | 5 |
| Silicone Slip Agent-2 | — | — | — | — | — | — | — |
| Silica | 1 | 1 | 1 | 1 | 1 | 1 | 1 |
| Total | 100 | 100 | 100 | 100 | 100 | 100 | 100 |
| Release test (Lloyd N/25 mm) | 1.7 | 1.3 | 1.3 | 1.3 | 1 | 1 | 1.1 |
| Release test (visual)[1] | Fail | Fail | Fail | Fail | Fail | Fail | Fail |
| Kinetic COF FTM | 0.18 | 0.16 | 0.16 | 0.17 | 0.16 | 0.16 | 0.17 |
| Static COF FTM | 0.19 | 0.23 | 0.18 | 0.21 | 0.20 | 0.20 | 0.20 |
| Adhesion (1-5) | 5 | 5 | 5 | 5 | 5 | 5 | 5 |
| Scratch Res. (1-5) | 5 | 5 | 5 | 5 | 5 | 5 | 5 |
| Example | 8 | 9 | 10 | 11 | 12 | 13 | 14 |
| Nitrocellulose (NC) Varnish | 11.7 | 7.7 | 15.7 | 27.6 | 24.3 | 28.1 | 28 |
| PU Resin | 20.3 | 24.3 | 14.3 | — | 7.7 | 7.7 | 7.7 |
| PVB Resin | 1.8 | 1.8 | 1.8 | 1.8 | 1.8 | 1.8 | 1.8 |
| CAB | 1.6 | 1.6 | 1.6 | 1.6 | 1.6 | 1.6 | 1.6 |
| Solvent | 23.6 | 20.6 | 24.6 | 27 | 22.6 | 22.6 | 22.6 |
| Solvent | 36 | 36 | 36 | 36 | 36 | 36 | 35.3 |
| Wax | 1 | 1 | 1 | 1 | 1 | 1 | 1 |
| Silicone Slip Agent-1 | 3 | 6 | 4 | 4 | 4 | — | — |
| Silicone Slip Agent-2 | — | — | — | — | — | 0.2 | 1 |
| Silica | 1 | 1 | 1 | 1 | 1 | 1 | 1 |
| Total | 100 | 100 | 100 | 100 | 100 | 100 | 100 |
| Release test (Lloyd N/25 mm) | 1.2 | 0.9 | 1.2 | 1.2 | 0.4 | 1.3 | 0.9 |
| Release test (visual)[1] | Fail | Fail | Pass | Pass | Pass | Fail | Pass |
| Kinetic COF FTM | 0.15 | 0.17 | 0.14 | 0.15 | 0.14 | 0.16 | 0.14 |
| Static COF FTM | 0.20 | 0.22 | 0.18 | 0.17 | 0.16 | 0.18 | 0.16 |
| Adhesion (1-5) | 5 | 5 | 5 | 5 | 5 | 5 | 5 |
| Scratch Res. (1-5) | 5 | 5 | 5 | 5 | 5 | 5 | 5 |

[1]Inventive Examples 10-12 and 14 passed the visual test, while Inventive Examples 1-9 and 13 failed. It should be noted that although Inventive Examples 1-9 and 13 were considered a fail for this particular end-use application, these formulations would still be useful for other end-use applications (e.g. packaging applications wherein the packaged material is less sticky than gum and thus would not remove particles during the release test). Thus, all of the Inventive Examples 1-14 remain within the scope of the current application.

OPV General Evaluation

Printing

To produce the printed structures of the present invention, a series of printing inks were printed using the following protocol:

For testing purposes, DFC inks from WO2022/064090 were used. The inks were reduced to a viscosity of 14-16 see at Ford 4 Cup by adding ethyl acetate. At 20° C., a Twist PET substrate is placed on the printing plate, and ink is placed on the material and a drawdown is made using K-2 drawdown bar.

After the application of ink, the printed material is either dried in an oven at 80° C. for 30 see or by using a hair dryer. When the drying is completed, the OPV Examples from Table 1 were applied at a dry coating weight of about 2 $g/m^2$ over the top of the ink as a second layer by using an anilox applicator. Subsequently, the OPV is dried using a hairdryer for about 30 seconds. Alternatively, where no ink is required, the OPV is printed directly onto the Twist PET with no intervening ink layer(s).

Adhesion Test

Adhesion was tested on the ink+OPV examples using adhesive tape TESA 4101PV2. The tape is adhered firmly to the printed surface and smoothed down, leaving a free end. The free end of the tape is then pulled back at an angle of approximately 900 with the tape being removed quickly with a steady pull. The print is then checked visually for ink removal. Results are graded on a 1-5 basis with 1-2 being poor (extensive ink removal); 3 being a marginal failure (moderate ink removal); and 4-5 being good-excellent (slight or no ink removal). A grade of 4 or 5 is considered a pass.

Scratch Resistance Test

Scratch resistance was tested on the ink+OPV examples. The print is laid on a hard surface. The back of the nail of the index finger is scratched vigorously across the printed surface. The print is then checked visually for ink removal. Results are graded on a 1-5 basis with 1-2 being poor (extensive ink removal); 3 being a marginal failure (moderate ink removal); and 4-5 being good-excellent (slight or no ink removal). A grade of 4 or 5 is considered a pass.

Heat Seal Resistance Test

Pressure is set at 500N based on 150 mm×10 mm surface area of jaws for 1 second, using a Brugger München HSG-CC Heat Sealing Machine. A printed substrate prepared according to the invention is placed against the non-treated side of an aluminum foil; pressure is applied; heat-sealing is tested at 140, 160, 160, 180, 200° C. Subsequently, the print is allowed to cool, and the aluminum foil is peeled away from the print surface. The print and the aluminum foil are inspected for ink removal. Results are graded on a 1-5 basis with 1-2 being poor (extensive ink removal); 3 being a pass with some ink removal (moderate ink removal); and 4-5 being a good-excellent pass (slight or no ink removal). A grade of 3-5 is considered a pass and as demonstrating heat-seal resistance. A grade of 4 or above is considered as an indicate of good heat-seal resistance properties, which are preferred for the present invention.

TABLE 2

| Conditions | Corona Treated PET | Chemical PET | PE | OPP | Al foil |
|---|---|---|---|---|---|
| Heat Sealing Results[1] | | | | | |
| Example 14 Heat Sealing Results | | | | | |
| 140' C./500N/1 sec | 5 | 5 | 5 | 3 | 5 |
| 160' C./500N/1 sec | 5 | 5 | 5 | film deformed[2] | 5 |
| 180' C./500N/1 sec | 5 | 5 | 5 | film deformed[2] | 5 |
| 200' C./500N/1 sec | 5 | 5 | 5 | film deformed[2] | 5 |
| Example 1 Heat Sealing Results | | | | | |
| 140' C./500N/1 sec | 5 | 5 | 5 | 3 | 5 |
| 160' C./500N/1 sec | 5 | 5 | 5 | film deformed[2] | 5 |
| 180' C./500N/1 sec | 5 | 5 | 5 | film deformed[2] | 5 |
| 200' C./500N/1 sec | 5 | 5 | 5 | film deformed[2] | 3 |

[1]Though heat sealing is a required property for some end-use applications, it is not a critical property for all end-use applications. Thus, tests were only performed on Examples 1 & 14, though all 14 Inventive Examples would be expected to have a grade of 3-5 (passing).
[2]OPP films have heat resistance up to 150° C. because of its characteristic properties.

OPV Release Properties Evaluation

CoF Test

Kinetic and static coefficient of friction (CoF) is measured using the friction table of a Lloyd Ametek LS1 instrument based on the protocol herein. As a reference point the CoF (coefficient of friction) value of siliconated paper without any ink or coating is taken as a reference point and was therefore measured, giving a value of 0.058 (kinetic) and 0.062 (static)

For the overprinted ink samples, a first layer of DFC-complaint ink is applied at a dry coating weight of 0.5-0.8 g/m$^2$ on Twist PET. Drying is carried out using a hair dryer or oven at 80° C. for 30 seconds. After drying, one of the inventive example DFC OPV's is applied on top of the top of the ink targeting a dry coating weight of 2 g/m$^2$. The printed materials are stored for 24 hours at 20-25° C. before testing for CoF values and release.

The Coefficient of Friction Test Fixture consists of a fixed horizontal table and a moveable sled. The sled (200 gram weight sled—sled area 40 cm$^2$) is covered with the test material. A tow line attaches the sled to a 50N load cell with a pulley that guides the towline during the test. The fixture is mounted to the base of the instrument and, as the crosshead/load cell moves, the sled is pulled across the horizontal table. The tow line must be parallel to the table and adjusted until slightly slack, and not taut (this configuration is well known in the art). The test is run at a speed of 100 mm/min (other speeds may be used) covering a distance of 150 mm. The kinetic and static CoF values will display on the computer screen once the test has fished. In one embodiment, the kinetic CoF will be in the range of 0.10-0.23, or 0.14-0.18 (print to metal), and the static CoF will be on the range 0.12-0.16, or 0.16-0.22 (print to metal).

Release Test (Visual)

Standard release testing is performed to assess sticking of chewing gum to the inventive OPV's. A piece of chewing gum is enclosed and wrapped in the printed substrate and stored for 24 hours at 20-25° C. Subsequently, the package is opened and visually observed for sticking of the OPV to the gum. An absence of particles is considered a passing result. If gum particles are observed on the surface of the OPV, this indicates that the OPV has insufficient repellant effect and is not suitable for use in chewing gum packaging applications. Inventive Examples 10-12 & 14 passed the visual test, while Inventive Examples 1-9 & 13 failed. It should be noted that although Inventive Examples 1-9 & 13 were considered a fail for this particular end-use application, these formulations would still be useful for other end-use applications, e.g. packaging applications in which the packaged material is less sticky than gum and thus would not exhibit particles during the release test.

An enhanced visual release test is performed in which gum is enclosed and wrapped in the printed packaging materials and stored at 30° C. at 80% relative humidity for 1 week. In this test, once again Examples 10-12 & 14 passed the visual release test, while Examples 1-9 & 13 did not.

A printed structure according to the present invention which is categorized as exhibiting visual release properties passes at least the standard release test and preferably also the enhanced release test described hereinabove.

Release Test (Lloyd)

Samples printed on Twist PET as described in the "Printing" section above are cut into 2.5 cm×12 cm pieces. Adhesive tape is adhered to the lacquered surface of Twist PET thus making a laminate. The two layers of the laminate are then separated carefully and fixed to the clamps of the Lloyd Ametek 50N Load cell tensile tester and drawn apart at a speed of 100 mm/minute. Average bond strength values are noted. Preferably, the Lloyd release value is in the range of 0-2.0 N/25 mm, the closer to 0 being the better.

Safety for Direct Food Contact

The underlying requirement in the present invention is that the OPV compositions and substances contained therein should be safe for food contact, particularly direct food contact. The provision of OPV compositions according to the present invention is underpinned by a "Basis for Safety" outcome. This is based on an assumption that 100% of any given substance in an OPV composition migrates into the foodstuff, thereby allowing a "worst-case calculation" for the concentration of the substance in the foodstuff. Variables which affect the result of the worst-case calculation include (or may consist of) the concentration of each substance in the OPV, the dry coating weight, the extent of coverage of the substrate surface with an OPV on a % basis, the surface area of print in contact with food, and the weight of the food. The value of said variables are selected depending on the end-applications for which the compositions will be used. The values selected for each variable are reported in the exposure scenarios which are used for the safety determination. The resulting worse-case calculation is then compared to the specific migration limit (SML) for the substance. The principle of comparing specific migration limits with worst-case calculations is known in the art and described in Appendix D of "Good Manufacturing Practice (GMP) Printing Inks for Food Contact Materials" (4th Edition; March 2016; published by European Printing Ink Association). Using this methodology, one arrives at a Basis for Safety outcome, the possibilities for which are shown in Table 3.

TABLE 3

| Basis for Safety outcomes | |
|---|---|
| Worst Case Calculation < SML | If 100% of the substance migrating into the food results in a level of migration that is below the Specific Migration Limit (SML), then there is no concern; the substance is safe for direct contact with food. This approach permits the safety of many substances to be determined without the need for migration testing. |
| Worst Case Calculation > SML | If the Worst-Case Calculation would result in 100% of the substance migrating into the food at a level that is above the Specific Migration Limit (SML), then the substance needs to be subjected to migration testing to determine whether it is safe for DFC. |
| Converter Review Converter Control | Some substances, such as solvents, are volatile and therefore evaporate during the drying process. Thus, the residual concentration of these substances in the dried film will be low. As the residual concentration of these substances is directly influenced by the actions of the converter (in how well the OPV is dried), the converter can determine whether the drying process is fit for purpose. This can be done by subjecting such substances by migration testing. In the exemplified OPVs described herein, migration testing on such volatile substances revealed that the amounts thereof are not detectable. Thus, a converter of ordinary skill, following reasonable industry practices, will readily be able to reduce residual amounts to levels safe for DFC. |

Some substances, especially impurities and other non-intentionally-added-substances (NIASs), do not have published specific migration limits. For these substances it is important to ensure that they do not migrate at unsafe levels and that there is a basis of safety in using an OPV containing these substances. The preferred basis for safety of such substances used in the provision of OPV compositions in the present invention is a hazard assessment-based approach, as discussed below.

The following publications, which are incorporated herein by reference, were relied upon for the Threshold of Toxicological Concern approach to hazard assessment developed by the European Food Safety Authority (EFSA), and in one instance, the World Health Organization (WHO):

1. EFSA Document: Outcome of the public consultation on the draft guidance on the use of the Threshold of Toxicological Concern approach in food safety assessment. APPROVED: 17 May 2019, doi:10.2903/sp.efsa.2019.EN-1661;
2. EFSA Document: Guidance on the use of the Threshold of Toxicological Concern approach in food safety assessment, ADOPTED: 24 Apr. 2019, doi: 10.2903/j.efsa.2019.5708;
3. EFSA Document: Priority topics for the development of risk assessment guidance by EFSA's Scientific Committee in 2016-2018, ADOPTED: 19 May 2016, doi: 10.2903/j.efsa.2016.4502;
4. EFSA and WHO document: Review of the Threshold of Toxicological Concern (TTC) approach and development of new TTC decision tree. PUBLISHED: 10 Mar. 2016; and
5. EFSA Document: Scientific Opinion on Exploring options for providing advice about possible human health risks based on the concept of Threshold of Toxicological Concern (TTC). EFSA Journal 2012; 10(7):2750

Advantageously, the substance hazard assessment approach follows the process as set out in the EuPIA (European Printing Ink Trade Association) document: EuPIA Guidance for Risk Assessment of Non-Intentionally Added Substances (NIAS) and Non-Evaluated or Non-Listed Substances (NLS) in printing inks for food contact materials (May 2021). This approach in turn follows EFSA (European Food Safety Authority) methodology.

Advantageously, the substance hazard assessment approach involves reviewing toxicological data to determine if the substance is genotoxic or has genotoxic potential. If there is no known toxicological data available for the substance then Qualitative Structure Activity Relationship (QSAR) toxicology prediction models are used to establish if the substance is genotoxic. In accordance with the EFSA "Guidance on the use of the Threshold of Toxicology Concern approach in food safety assessment" more than one model is used in the form of "read-across" from structurally similar chemicals. VEGA QSAR (version 1.1.5) was used in the present invention to establish genotoxicity. If a substance is not genotoxic it may be suitable for analysis using the Threshold for Toxicological Concern (TCC) approach and assigned a Cramer Class. If the absence of mutagenicity is the only information available then the applicable limit should be no more than Cramer Class III (corresponding to self-derived SML of up to 90 ppb).

Tables 4 and 5 below show how all of the materials chosen for the OPVs according to the present invention are within the guidelines for migration, even under strict conditions and worst-case scenarios that exceed the various regulatory requirements.

The data in Tables 4 and 5 include information on the substances present in the OPV, including substance name, CAS number, the source of the specific migration limit or restriction, and the amount of substance permitted in food. Regulation (EU) No. 10/2011 (Annex I) sets forth specific migration limits for the substances (see https://eur-lex.europa.eu/legal-content/EN/TXT/HTML/?uri=CELEX:32011R0010&from=EN). Article 11 of this Regulation indicates that "For substances for which no specific migration limit or other restrictions are provided in Annex I, a generic specific migration limit of 60 mg/kg shall apply".

The inventors have demonstrated that, following the approach described above, the OPV's detailed in this invention are suitable for use in direct food contact applications. The level of substance being demonstrated by either worst-case calculation or by migration testing, and the hazard of the substance being demonstrated either by reference to regulatory positive lists or by substance hazard assessment.

Solvent-Based Direct Food Contact Exposure Scenarios

Figure 2A:
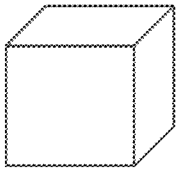
FIG. 2A provides a visual representation of the EU Cube exposure scenario and FIG. 2B provides a visual representation of Application 1, which is the chewing gum exposure scenario.

The standard EU exposure scenario uses 1 kg of food wrapped in a 10 cm×10 cm×10 cm cube of packaging, giving 1 kg of food wrapped in 0.06 $m^2$ of packaging. This scenario is normally referred to as the EU Cube exposure scenario (see FIG. 2A). Having an exposure model such as the EU cube exposure scenario allows a Worst-Case Calculation for how much substance would migrate into 1 kg of food if all of the substance in the food contact layer migrated into the food. Thus, the specific migration limits for the various substances recited in EU Regulation 10/2011 are therefore associated with the EU Cube exposure model.

In reality packaging can deviate from the EU cube and so it is good practice to consider real applications and the exposure scenarios that these represent. One such application is a described below.

Figure 2B:
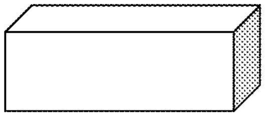

Application 1. Release applications, for example Chewing gum being in contact with an OPV (FIG. 2B; Release Application—chewing gum). In this scenario it is assumed that the substrate is 100% printed with an OPV.

The exposure can be compared to the standard EU Cube model as follows:

Area of Outer Wrapper: 8.4 cm×3.9 cm=32.76 $cm^2$=0.003276 $m^2$

Area of print in contact with chewing gum=3.5 cm×3.9 cm=13.65 $cm^2$=0.001365 $m^2$ Chewing gum food weight=1.5-1.6 gr=0.0015-0.0016 Kg Chewing gum packaging exposure scenario gives 1 kg food in contact with X $m^2$ printed wrap. This exposure scenario gives X % of the exposure of the EU cube.

X %=0.001365 $m^2$/0.0016 KG=0.8531 $m^2$/kg

The standard EU cube is a 10 cm×10 cm×10 cm cube containing 1 kg of food. The area of this cube is 0.06 $m^2$, so this gives 0.06 $m^2$/kg food.

The chewing gum exposure scenario is 14.2 times worse (or 1420%) of the EU cube.

Worst-Case Calculation (WCC) Data

As described hereinabove, the worst-case calculation assumes 100% migration of the substance to the foodstuff. Table 4 below presents the data generated according to the present invention, in which the worst-case calculation (WCC) is expressed as a percentage of the specific migration limit (SML; i.e. the maximum amount permitted) in each of the standard EU Cube model and Applications1 above. In Table 4:

PR=EU Plastics Regulation No. 10/2011

HA=internal hazard assessment

SO=Swiss Ordinance (Ordinance on Materials and Articles (817.023.21) by the Food Safety and Veterinary Office (FSVO) of the Swiss Federal Department of Home Affairs (FDHA); latest version published 1 Dec. 2020)

Default=10 ppb

The SMLs, whether they are derived from the EU Plastics Regulation or from the Swiss Ordinance or are self-derived SMLs, are absolute values of the maximum amount (in mg) of a substance which is allowed to migrate into 1 kg food. Thus, SMLs are expressed in units of mg substance/kg food. SMLs are based on the toxicology of that substance. The SMLs referred to herein are all based on a regulatory assumption that a 60 kg adult consumes 1 kg of food per day and that the food is packaged in a cubic container (10 cm×10 cm×10 cm) which has a surface area of 6 $dm^2$ and which releases the substance into the food.

Extraction Testing

The substances in Table 4 were identified by extraction testing as follows. The raw materials were dissolved in several solvents to establish which solvent would be best to use for the analysis. Ethyl acetate was found to be the best solvent for analysis. 0.1 g of each of the raw material samples were dissolved in 10 mL of ethyl acetate with an internal standard of a known concentration added to each. The 10 mL extracts were sonicated at ambient temperature for 10 minutes to allow full dissolution of the raw material into the solvent. Once sonicated, 1 mL was taken from each raw material extract and syringe filtered using a 0.45 m PTFE syringe filter into a 2 mL GC vial, ready for analysis on a GC-MS instrument. GC-MS was performed on a Thermo ISQ GC-MS system with a PTV injection port and a TG-5SILMS, 30 m column having 0.25 mm internal diameter and 0.25 μm thickness. The injection temperature was from 70° C. to 320° C. according to the table below:

| Temperature range (° C./min) | Temperature (° C.) | Time (min) |
|---|---|---|
| — | 70 | 0.05 |
| 14.5 | 240 | 1.00 |
| 14.5 | 320 | 2.00 |

The GC oven temperature is increased from 45° C. to 320° C. (with a flow rate of 1 mL/min) according to the table below:

| Temperature ramp (° C./min) | Temperature (° C.) | Time (min) |
|---|---|---|
| — | 45 | 2 |
| 20 | 130 | 0 |
| 7.5 | 190 | 0 |
| 7.5 | 280 | 0 |
| 15 | 320 | 6 |

The data obtained from GC-MS was analysed using internal and NIST libraries and semi-quantified against the response of the internal standard.

TABLE 4

WORST CASE CALCULATION DATA

| CAS No. of substance | Name of substance | SML (or restriction) (mg substance/kg food) | Source of restriction/ SML used |
|---|---|---|---|
| XXXXXXX-XX-X format | Name as per Swiss Federal Office for Public Health (FOPH) Ordinance on Materials and Articles (SR 817.023.21) Annex 10 includes provisions specific to food packaging inks. | Ranking: Plastics Regulation > Hazard Assessment > Provisional List of Additives used in Plastics > Swiss Ordinance | PR = Plastics Regulation HA = Hazard Assessed SO = FPOH Swiss Ordinance Derived = Calculated from recognized data set using EFSA principles. Default = 10 ppb (2 ppb for various migrants such as PAA) |

TABLE 4-continued

| WORST CASE CALCULATION DATA | | | |
|---|---|---|---|
| 0009004-70-0 | nitrocellulose | 60 | PR |
| 0063148-62-9 | polydimethylsiloxane (Mw >6800 Da) | 60 | PR |
| 0009004-36-8 | cellulose acetate butyrate | 60 | PR |
| 0007631-86-9 | silicon dioxide | 60 | PR |
| 0009002-88-4 | polyethylene wax | 60 | PR |
| 0008002-74-2 | waxes, refined, derived from petroleum based or synthetic hydrocarbon feedstocks, high viscosity | 60 | PR |
| 0000128-37-0 | 2,6-Di-tert-butyl-p-cresol (=BHT) | 3 | PR |
| 0000075-65-0 | tert-Butanol | 10 | SO |
| 0004098-71-9 | IPDI (isophorone diisocyanate) | 1 | PR |
| 0004744-11-0 | Propane, 1,1-dipropoxy- | 0.09 | HA |
| 0000120-93-4 | 2-Imidazolidinone | 4.98 | HA |
| 0002051-50-5 | 2-Octyl acetate | 0.09 | HA |
| 0000626-35-7 | Ethyl nitro acetate | 0.01 | Default 10 ppb |
| 0000542-10-9 | Ethylidene diacetate | 0.09 | HA |
| 0000498-60-2 | 3-Furaldehyde | 0.09 | HA |
| 0002396-43-2 | 2,4,6-tripropyl-1,3,5-Trioxane | 0.09 | HA |
| 0000064-17-5 | ethanol | 60 | PR |
| 0000067-63-0 | 2-propanol | 60 | PR |
| 0000141-78-6 | acetic acid, ethyl ester | 60 | PR |
| 0000071-23-8 | 1-propanol | 60 | PR |
| 0000109-60-4 | Acetic acid, propyl ester | 60 | SO |
| 0007732-18-5 | water | 60 | PR |

| CAS No. of substance | Amount of substance in product (wt %) | Amount of substance in dried ink film (wt %) | Maximum % of SML mg/kg EU Cube model | Maximum % of SML mg/kg Exposure model |
|---|---|---|---|---|
| XXXXXXX-XX-X format | | | This figure to be used to determine compliance | This figure to be used to determine compliance |
| 0009004-70-0 | 7.84 | 42.90 | 51 | 731 |
| 0063148-62-9 | 1.00 | 5.47 | 7 | 93 |
| 0009004-36-8 | 1.60 | 8.76 | 11 | 149 |
| 0007631-86-9 | 1.00 | 5.47 | 7 | 93 |
| 0009002-88-4 | 0.50 | 2.74 | 3 | 47 |
| 0008002-74-2 | 0.50 | 2.74 | 3 | 47 |
| 0000128-37-0 | 0.09 | 0.43 | 18 | 255.6 |
| 0000075-65-0 | 0.02 | 0.09 | 2 | 28.4 |
| 0004098-71-9 | 0.59 | 2.80 | ***340*** | 4828 |
| 0004744-11-0 | 0.13 | 0.60 | ***800*** | 11360 |
| 0000120-93-4 | 0.04 | 0.17 | 5 | 71 |
| 0002051-50-5 | 0.01 | 0.03 | 43 | 610.6 |
| 0000626-35-7 | 0.00 | 0.01 | ***130*** | 1846 |
| 0000542-10-9 | 0.00 | 0.01 | 10 | 142 |
| 0000498-60-2 | 0.00 | 0.01 | 10 | 142 |
| 0002396-43-2 | 0.02 | 0.11 | ***150*** | 2130 |
| 0000064-17-5 | 33.14 | Converter Control | Converter Control | Converter Control |
| 0000067-63-0 | 1.11 | Converter Control | Converter Control | Converter Control |
| 0000141-78-6 | 39.90 | Converter Control | Converter Control | Converter Control |
| 0000071-23-8 | 2.28 | Converter Control | Converter Control | Converter Control |
| 0000109-60-4 | 2.28 | Converter Control | Converter Control | Converter Control |
| 0007732-18-5 | 0.10 | Converter Control | Converter Control | Converter Control |

Worst Case Calculation is based on 100% migration

SML = Specific migration limit, the maximum amount permitted

PR = Plastics Regulation/HA = internal hazard assessment/FSVO = Swiss Ordinance/Default = 10 ppb Table 4 above represents a hypothetical migration analysis based on worst case scenarios to show that for some substances and applications the maximum % of SML is over 100%, this means that if all of the substance were to migrate it would be above the migration limit.

For these instances we need to check and show migration data (to see if in reality there are substances above the limits). Two categories of cells in Table 4 are of particular note:

a. Cells portrayed using underlined/italicized/bold font represent instances where the worst-case calculation, expressed as a percentage of SML (or restriction), for a substance is over 100% in one or more applications. As explained above, if the entirety of such a substance were to migrate from the packaging to the foodstuff, the migration limit would be exceeded. For these substances, the provision of OPV compositions according to the invention involves a determination of the true level of migration, by migration testing, to assess whether such substances in fact exceed the hypothetical limits, as explained below and in Table 5.

b. Cells marked as "Converter Control": As explained in Table 3, the concentration of volatile substances in a dried OPV layer may depend on the process (in particular the drying process) applied by a downstream user of the OPV, namely the convertor. Advantageously, migration testing is extended to encompass such substances. As noted in Table 5 below, none of these substances were detected in the migration testing conducted by the inventors.

Migration Testing

For any composition containing a substance which exhibits a worst-case calculation (WCC) which exceeds the specific migration limit then, according to the present invention, the true level of migration is determined analytically by migration testing of the OPV composition in which the substance is contained. The true migration levels for volatile substances whose concentration in the final dried OPV may be dependent on the downstream user (e.g. the convertor) are optionally also determined.

As will be understood in the art, the amount of substance that will migrate into a food is dependent on the chemistry of the food as well as contact times and temperatures. To simulate this, the inventors considered migration using 2 different food simulant/temperature/time scenarios that are relevant for the types of applications where the Release OPV may be used. Table 5 contains the results of the migration testing of the OPV composition, in particular the results of the GC-MS analysis for each of the 2 different food simulant/temperature/time scenarios, namely the Tenax food simulant for 10 days at 60° C. and 40° C.

Migration Testing was Performed as Follows:

Prints, 50 $cm^2$ were placed into a migration cell with the unprinted side in contact with 2 g of Tenax simulant for 10 days at both 40° C. and 60° C. A cell 'blank', based on Tenax in contact with virgin aluminum foil, was used at both testing temperatures to ensure that no contaminants were introduced during cell construction or sample workup. After 10 days, the cells were emptied and the Tenax extracted with 60 mL of acetonitrile. The acetonitrile was concentrated to 1 mL using an automatic evaporator and the resulting concentrate analyzed by GC-MS (method IM304).

All data analysis for the migration test was done in the GC-MS full scan data. This means that any peaks seen were identified using library matches (internal and NIST libraries) and quantified against the response of the internal standard. The components identified from the migration tests were cross-checked against the data acquired from the raw material analysis to establish the source of some of the components seen to migrate.

Table 5 provides results of analytic testing for detectable materials in the OPV described herein. For ease of reference, Table 5 incorporates the information from Table 4 regarding the relevant substances, their SML/restriction, the source of the SML/restriction, and the WCCs (expressed as a percentage of the SML) of each substance in the standard EU cube model.

In Table 5, "ND" means not detected (defined as a signal to noise ratio of less than 3:1).

The measured value in this empirical migration testing should be below 100% of the SML for any given substance in order for an OPV composition which contains that substance to be considered acceptable for unrestricted use in food contact applications, and in particular direct food contact applications.

The following table provides results of analytic testing for detectable materials in the OPV described herein.

TABLE 5

Migration Results

| Product containing substance | CAS No of substance | Name of substance | SML or Restriction (mg substance/kg food) | Source of SML or restriction | Worst Case Calculation of migration in EU Cube model (as a percentage of SML) | Analytically measured migration (% SML) Tenax food simulant for 10 days at 60° C. | Analytically measured migration (% SML) Tenax food simulant for 10 days at 40° C. |
|---|---|---|---|---|---|---|---|
| | 0009004-70-0 | nitrocellulose | 60 | PR | 51 | ND | ND |
| | 0063148-62-9 | polydimethylsiloxane (Mw >6800 Da) | 60 | PR | 7 | ND | ND |
| | 0009004-36-8 | cellulose acetate butyrate | 60 | PR | 11 | ND | ND |
| | 0007631-86-9 | silicon dioxide | 60 | PR | 7 | ND | ND |
| | 0009002-88-4 | polyethylene wax | 60 | PR | 3 | ND | ND |
| | 0008002-74-2 | waxes, refined, derived from petroleum based or synthetic hydrocarbon feedstocks, high viscosity | 60 | PR | 3 | ND | ND |
| | 0000128-37-0 | 2,6-Di-tert-butyl-p-cresol (=BHT) | 3 | PR | 18 | ND | ND |
| | 0000075-65-0 | tert-Butanol | 10 | SO | 2 | ND | ND |
| | 0004098-71-9 | IPDI (isophorone diisocyanate) | 1 | PR | 340 | ND | ND |

TABLE 5-continued

Migration Results

| Product containing substance | CAS No of substance | Name of substance | SML or Restriction (mg substance/kg food) | Source of SML or restriction | Worst Case Calculation of migration in EU Cube model (as a percentage of SML) | Analytically measured migration (% SML) Tenax food simulant for 10 days at 60° C. | Tenax food simulant for 10 days at 40° C. |
|---|---|---|---|---|---|---|---|
| | 0004744-11-0 | Propane, 1,1-dipropoxy- | 0.09 | HA | 800 | ND | ND |
| | 0000120-93-4 | 2-Imidazolidinone | 4.98 | HA | 5 | ND | ND |
| | 0002051-50-5 | 2-Octyl acetate | 0.09 | HA | 43 | ND | ND |
| | 0000626-35-7 | Ethyl nitro acetate | 0.01 | Default 10 ppb | 130 | ND | ND |
| | 0000542-10-9 | Ethylidene diacetate | 0.09 | HA | 10 | ND | ND |
| SBDEV976 | 0000498-60-2 | 3-Furaldehyde | 0.09 | HA | 10 | ND | ND |
| | 0002396-43-2 | 2,4,6-tripropyl-1,3,5-Trioxane | 0.09 | HA | 150 | ND | ND |
| | 0000064-17-5 | ethanol | 60 | PR | Converter Control | ND | ND |
| | 0000067-63-0 | 2-propanol | 60 | PR | Converter Control | ND | ND |
| | 0000141-78-6 | acetic acid, ethyl ester | 60 | PR | Converter Control | ND | ND |
| | 0000071-23-8 | 1-propanol | 60 | PR | Converter Control | ND | ND |
| | 0000109-60-4 | Acetic acid, propyl ester | 60 | SO | Converter Control | ND | ND |
| | 0007732-18-5 | water | 60 | PR | Converter Control | ND | ND |

The empirical evidence of true migration levels in Table 5 therefore informs that the OPV's herein formulated contain no substances for which the migration limit exceeds the SML of the standard EU Cube model, and are therefore acceptable for direct food contact in the following packaging scenario:

Application 1 (Release Application—chewing gum): As explained above, the maximum exposure in this scenario is approximately 1420% of the exposure in the EU Cube model.

What is claimed:

1. A method of producing a printed structure comprising the steps of:
(i) providing a substrate;
(ii) subsequently printing one or more coating layers of direct food contact (DFC)-compliant overprint varnish (OPV) onto a first side of the substrate, wherein the DFC-compliant OPV comprises no more than 2.0% by weight of any colorants relative to the weight of the OPV, wherein the OPV comprises a silicone release agent, and wherein the silicone release agent is an acyclic polydimethylsiloxane (PDMS), and is present in the printed structure in an amount of 1.0 to 47.0% by dry weight of the OPV layer and wherein the printed structure does not comprise siliconated paper.

2. The method of claim 1, wherein said OPV is printed directly onto the substrate.

3. The method of claim 1, comprising the steps of:
(i) providing a substrate;
(ii) printing one or more layers of DFC-compliant ink onto a first side of the substrate;
(iii) subsequently printing one or more coating layers of DFC-compliant OPV over the top of said one or more DFC-compliant ink layers, wherein the DFC-compliant OPV comprises no more than 2.0% by weight of any colorants relative to the weight of the OPV.

4. The method according to claim 1, wherein said first side of the substrate in the final printed structure is comprised exclusively of DFC-compliant coatings and, where present, DFC-compliant inks.

5. The method of claim 1, comprising the steps of: (i) providing a substrate; (ii) printing one or more layers of DFC-compliant ink onto a first side of the substrate; (iii) printing one or more layers of an ink onto a second side of the substrate; (iv) subsequently printing one or more coating layers of DFC-compliant OPV over the top of said one or more DFC-compliant ink layers on said first side of the substrate.

6. The method of claim 5, wherein said printed structure is suitable for use as food packaging and said first side of the substrate faces towards the interior of the packaging and said second side of the substrate is an exterior-facing side of the packaging.

7. The method of claim 1, wherein the substrate is a single layer substrate.

8. The method of claim 1, wherein the OPV does not comprise any colorant.

9. The method of claim 1, wherein the silicone release agent is present in the printed structure in an amount of 2.0 to 40.0%.

10. The method of claim 1, wherein the silicone release agent is a linear acyclic PDMS.

11. The method of claim 1, wherein the silicone release agent has a molecular weight of greater than 5000 Daltons.

12. The method of claim 1, wherein the printed structure exhibits visual release properties.

13. The method of claim 1, wherein the printed structure exhibits heat seal resistance.

14. The method of claim 1, wherein the migration limits for all printed materials used to make the printed structure are below the threshold for a human of 60 kg in accordance with the EU Cube Model.

15. The method of claim 1, wherein the substrate is selected from the group consisting of PE, PP, PET, OPP, aluminum foil and combinations thereof.

16. The method of claim 15, wherein the substrate is a twistable polyester film.

17. The method according to claim 1, wherein said printed structure is comprised exclusively of DFC-compliant coatings and, where present, DFC-compliant inks.

* * * * *